United States Patent
Cakarel et al.

(10) Patent No.: US 9,276,941 B2
(45) Date of Patent: Mar. 1, 2016

(54) METHOD AND APPARATUS FOR ACCESSING MEDIA

(71) Applicant: MUBI UK Limited, London (GB)

(72) Inventors: Efe Cakarel, London (GB); Geoffrey Litt, London (GB)

(73) Assignee: MUBI UK LIMITED, London (GB)

( * ) Notice: Subject to any disclaimer, the term of this patent is extended or adjusted under 35 U.S.C. 154(b) by 0 days.

(21) Appl. No.: 14/312,369

(22) Filed: Jun. 23, 2014

(65) Prior Publication Data

US 2014/0310819 A1    Oct. 16, 2014

Related U.S. Application Data

(63) Continuation of application No. PCT/GB2012/053222, filed on Dec. 20, 2012.

(30) Foreign Application Priority Data

Dec. 23, 2011    (GB) .................................. 1122276.7

(51) Int. Cl.
| | |
|---|---|
| H04N 21/4335 | (2011.01) |
| H04L 29/06 | (2006.01) |
| H04N 21/472 | (2011.01) |
| H04N 21/2225 | (2011.01) |
| H04N 21/231 | (2011.01) |
| H04N 21/8355 | (2011.01) |
| G06F 21/10 | (2013.01) |

(52) U.S. Cl.
CPC ................ *H04L 63/10* (2013.01); *G06F 21/10* (2013.01); *H04N 21/2225* (2013.01); *H04N 21/23113* (2013.01); *H04N 21/4335* (2013.01); *H04N 21/47202* (2013.01); *H04N 21/8355* (2013.01)

(58) Field of Classification Search
CPC .................... H04N 21/47202; H04N 21/4335; H04N 21/8355
See application file for complete search history.

(56) References Cited

U.S. PATENT DOCUMENTS

| | | | | |
|---|---|---|---|---|
| 6,061,504 | A  * | 5/2000 | Tzelnic | G06F 11/1464 348/E5.008 |
| 2002/0129375 | A1* | 9/2002 | Kim | H04N 7/17318 725/100 |
| 2002/0133830 | A1* | 9/2002 | Kim | H04N 7/17318 725/142 |
| 2003/0008708 | A1* | 1/2003 | Suchocki | A63F 13/10 463/29 |
| 2004/0163114 | A1* | 8/2004 | Rodriguez | G06F 3/0482 725/87 |
| 2005/0155079 | A1* | 7/2005 | Chen | H04N 7/17318 725/115 |
| 2005/0177853 | A1* | 8/2005 | Williams | H04N 21/2181 725/81 |

(Continued)

*Primary Examiner* — Jason K. Gee
*Assistant Examiner* — Zhimei Zhu
(74) *Attorney, Agent, or Firm* — EIP US LLP

(57) ABSTRACT

A system controls access to a group of media items. A client device is operable by a user. A media server is coupled to at least one media data source, wherein the at least one media data source stores one or more media items for supply, by the media server, to the client device over a network. An authorization server is coupled to an authorization data source. The authorization data source stores data identifying a group of media items of fixed group size N that are accessible by the user, each media item in said group having a different associated availability parameter value indicating a number of time periods M within which access to the media item is available, wherein the authorization server is arranged to authorize the media server to supply a media item to the client device if said media item belongs to the group of media items.

20 Claims, 10 Drawing Sheets

(56) References Cited

U.S. PATENT DOCUMENTS

| | | | |
|---|---|---|---|
| 2006/0156372 A1* | 7/2006 | Cansler, Jr. | H04N 7/17318 725/134 |
| 2007/0079342 A1 | 4/2007 | Ellis et al. | |
| 2007/0180465 A1* | 8/2007 | Ou | G06Q 30/0245 725/34 |
| 2008/0155059 A1* | 6/2008 | Hardin | H04N 7/17336 709/218 |
| 2008/0155613 A1* | 6/2008 | Benya | H04N 7/17318 725/89 |
| 2008/0178239 A1* | 7/2008 | Yampanis | H04L 41/5064 725/110 |
| 2009/0172761 A1 | 7/2009 | Lindsley et al. | |
| 2010/0100899 A1 | 4/2010 | Bradbury et al. | |
| 2010/0146568 A1 | 6/2010 | Hariharan et al. | |
| 2010/0269144 A1* | 10/2010 | Forsman | H04N 7/17336 725/92 |
| 2011/0093905 A1* | 4/2011 | McKinley | H04N 7/17336 725/92 |
| 2011/0265126 A1* | 10/2011 | Rouse | H04N 5/765 725/61 |
| 2012/0204215 A1* | 8/2012 | Hayashi | H04N 21/23106 725/88 |
| 2013/0254308 A1* | 9/2013 | Rose | H04N 7/17318 709/206 |

* cited by examiner

METHOD AND APPARATUS FOR ACCESSING MEDIA

CROSS-REFERENCE TO RELATED APPLICATIONS

This is a continuation under 35 U.S.C. §120 of International Application No. PCT/GB2012/053222, filed Dec. 20, 2012 (published by the International Bureau as International Publication No. WO2013093488 A2 on Jun. 27, 2013), which claims priority to GB Patent Application No. 1122276.7, filed Dec. 23, 2011. The entire contents of each of the above-referenced applications are hereby incorporated by reference.

BACKGROUND OF THE INVENTION

1. Field of the Invention

The present invention relates to controlling access to a media item. In particular, but not exclusively, the present invention relates to a method and apparatus for accessing a group of media items. This method and apparatus may, for example, be applied to a video streaming service that operates over a network.

2. Description of the Related Technology

With the growth of high-speed network connections, the streaming of audio-video data has become a viable option for the supply of media to a user. This audio-video data may comprise, amongst others: movies, television programs, Internet programming, Internet Protocol Television (IPTV), radio programs, music videos and/or audio tracks, user-generated content and so-called "podcasts". Typically, audio-video data is stored on a video server and delivered to a client device over one or more intermediate network connections. For a residential user, these network connections may be provided using a variety of physical communications media, for example a fiber optic, Digital Subscriber Line (DSL) or cable connection from a property to a local exchange which is then coupled to a Public Switched Telephone Network (PSTN) or a cable provider's network system. Alternatively, wireless telecommunications systems such as those using the Universal Mobile Telecommunications System (UMTS) or any of the Long Term Evolution (LTE) standards may provide a communications medium for fixed or mobile client devices. These latter network systems may in turn be connected to a series of one or more networks that may comprise servers, routers and other networking equipment that communicate using protocols such as Transmission Control Protocol (TCP) and Internet Protocol (IP). These systems are often collectively referred to as the "Internet". The video server is also connected to the same systems. Hence, audio-video data may be said to be delivered to a client device over the "Internet".

The trend towards high-speed network connections that can support the streaming of audio-video data has progressed in parallel with an increase in the quantity of digitized media content. For example, it is not uncommon for newly released movies to be available as a digital download as well as being available as a digital file on a conventional storage medium such as a Digital Versatile Disc (DVD). Furthermore, many content owners and suppliers are digitalizing catalog movie titles. With the communication capabilities of the Internet and so-called social media technologies, e.g. messaging and publishing technologies, the cultural awareness of consumers is also growing. This is driving a demand for more obscure media items that may have had a foreign and/or limited public release. There will thus soon be a point where most movies that have been released to the public in the last century will be available in a digital form suitable for delivery over the aforementioned high-speed network connections.

The increased viability of digital delivery over the Internet and an ever increasing library of media items lead to technical challenges for media suppliers. The growing library of available media items requires large-scale storage systems. At the same time, an increasing number of users seeking access to content requires fault-tolerant systems that can cope with high traffic rates. Large and complex systems that meet these requirements are expensive and require full time maintenance from one or more engineers. These requirements are also compounded by user's expectations. Users often look for, and expect, quality-of-service (QoS) and picture or sound quality equivalent to broadcast networks, such as terrestrial television or radio, or DVD playback. This requires high picture resolutions, so-called high definition (HD) formats having resolutions of 1280 by 720 pixels (720p) or 1920 by 1080 (1080i/1080p), and/or high bit rate or lossless audio compression technologies. Meeting these expectations requires an increase in the size of the digital files and thus the storage demands are more onerous. This needs to be traded-off with caching and access strategies that allow streaming, for example, some compression formats require complex encoding and decoding algorithms that introduce unacceptable delays into streaming services.

Media suppliers that are not content owners also have to implement technical systems that can accommodate the requirements of the content owners. Licensing arrangements for digital content often require the recordal of media-supply metrics. For example, copyright provisions may mean that a license limits the number of downloads of a particular media item, e.g. 200,000 user downloads, or that the license requires geographical limitations, e.g. users in country C are not allowed to download the media item.

There is thus a need for an approach to accessing media items such as audio-video data in applications such as video streaming that overcomes at least a number of the aforementioned requirements, for example that supplies high-quality data over networks such as the Internet while minimizing the cost and complexity of the supply systems.

There is yet a further need for a workable approach to accessing a near infinite library of media items that does not overwhelm a user yet allows serendipitous discovery of new content.

SUMMARY

In accordance with an embodiment, there is provided a computer-implemented method of controlling access to a media item over an electronic communications medium, comprising providing, to an electronic device, access to a group of media items having a fixed group size N, a media item having an availability parameter, the availability parameter indicating a number of time periods M within which access to the media item is available, each media item in the group having a different availability parameter value, and, for a transition to a new time period, removing a first media item from the group of media items whose availability parameter indicates that the time within which access to the media item is available has expired for the new time period and adding a second media item to the group of media items, the availability parameter for the second media item may be set such that the number of time periods M is equal to the fixed group size N.

This computer implemented method facilitates the management of media items, e.g. audio-video data such as films, by providing a way in which to reduce the resource costs associated with media delivery while providing users with a regularly changing group of media items. By only providing access to a group of media items that has a fixed size, and for example is smaller than a larger library or archive of media items, resources can be focused on providing the limited number of media items. By providing access to a group of media items whose size equals the time in which a newly added media item is available, management of the group of media items is made more efficient; for example, it simplifies the addition and removal of a media item from the group at a time transition. This results in easier implementation and less down time for engineers. Accessing a media item may comprise downloading or streaming a media item.

In accordance with an embodiment, there is provided a method of controlling access to media items, may comprise receiving a request from a user of a client device, at a server device, granting access to a set of N media items, each media item may be available for a number M of time periods, the values of M for the set of media items ranging from 1 to N, wherein, for each new time period, if the availability of a media item has expired, said media item is removed from the set of N media items and replaced by a new media item with a value of M equal to N. Here, the set of N media items may be selected from a library of R media items, wherein R is greater than N, the new media item may be selected from said library.

In accordance with an embodiment, there is provided an apparatus for controlling access to a group of media items may comprise a control database comprising records identifying at least a group of media items of fixed group size N, the records storing an availability parameter for a media item, the availability parameter indicating a number of time periods M within which access to the media item is available, wherein each media item in the group has a different availability parameter value and a media access component coupled to the control database, the media access component arranged to grant access to the group of media items to a client device and, for a transition to a new time period, remove a reference to a first media item from said records identifying the group of media items, the first media item may be a media item whose availability parameter indicates that the time within which access to the media item is available has expired for the new time period and add a reference to a second media item to said records identifying the group of media items, the availability parameter for the second media item may be set such that the number of time periods M is equal to the fixed group size N.

In accordance with an embodiment, there is provided a system for controlling access to a group of media items comprising a client device operable by a user, a media server coupled to at least one media data source, the at least one media data source storing one or more media items for supply, by the media server, to the client device over a network, and an authorization server coupled to an authorization data source, the authorization data source storing data identifying a group of media items of fixed group size N that are accessible by the user, each media item in said group having a different associated availability parameter values indicating a number of time periods M within which access to the media item is available, wherein the authorization server is arranged to authorize the media server to supply a media item to the client device if said media item belongs to the group of media items.

In accordance with an embodiment, there is provided a method for selecting a media item for electronic access comprising displaying, on a user interface, metadata for a media item in a library of media items, media items in the library of media items may be inaccessible to a user, receiving, at a computing device, feedback data from the user for the media item, and updating, on a computing device, a feedback parameter for the media item based on the received feedback data, whereby a media item is selected for inclusion in a group of one or more media items accessible to a user based on the relative value of a feedback parameter associated with said media item when compared to one or more values of one or more feedback parameters of one or more respective other media items in the library of media items.

This method provides a way to select a media item for inclusion in a group of accessible media items. It is particularly suited to automated operation, for example it may be implemented with minimal engineer supervision. It also enables users to interact with a media supply system.

Further features and advantages of the invention will become apparent from the following description of preferred embodiments of the invention, given by way of example only, which is made with reference to the accompanying drawings.

DETAILED DESCRIPTION OF CERTAIN INVENTIVE EMBODIMENTS

Embodiments described herein provide a method, apparatus and system for controlling access to a library of media items. In certain embodiments, access is reduced to a limited group of media items of fixed size N. This reduces storage requirements: only data files relating to N media items need be hosted by the media server, rather than, say, a potentially much larger number of media items that comprise a complete library of media items. Additionally, resources may be directed to the supply of a subset of a much larger, and potentially infinite, library of media titles; for example, memory and processor resources only need be assigned to cache, encode and potentially encrypt the limited group of media items. Furthermore, if multiple file formats for a media item are required, e.g. for mobile, high definition and fiber-coupled devices, then these only need be prepared for a limited number of media items.

Certain embodiments described herein provide a mechanism for adding and removing media items. This facilitates discovery of new media content as new items are added to the group of media items at regular intervals. In some embodiments, each media item in the group of media items has an availability parameter that sets a time for which the media item is available. This time may be measured in one or more discrete time periods. If each media item has a different availability parameter value that changes with each new time period, a rotating selection of media items can be provided to a user. Resources, such as server capacity, can then be preferably assigned to the supply of media items that are soon to expire, as it is likely that these will have higher traffic rates. These embodiments further support the requirements of content owners and can be tailored for specific geographical regions.

Figure 1:
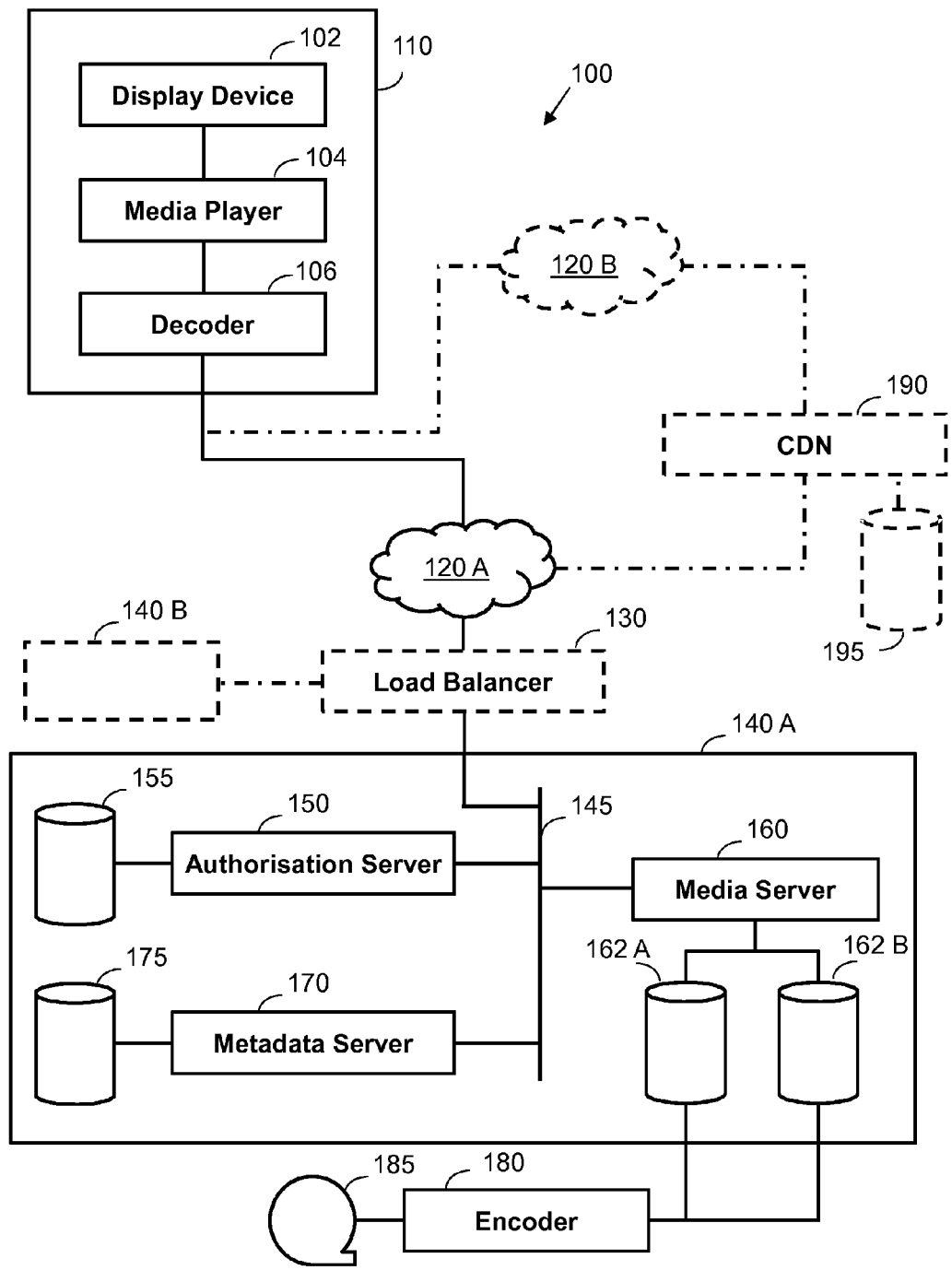
FIG. 1 is a schematic diagram showing an exemplary system for delivering a media item from a media server to a client device.

FIG. 1 is a schematic diagram showing an exemplary system 100 for delivering a media item from a media server 170 to a client device 110. According to one embodiment, a client device 110 may comprise a display device 102 for viewing video content, a media player 104 for processing video content and supplying said content for rendering on the display device 102, and a decoder 106 for decoding a compressed and/or encrypted data stream. Each of components 102, 104 and 106 may be integrated in a single device or may comprise separate, yet coupled, devices. The client device 110 may comprise, amongst others, cell phones (including so-called "smart phones"), personal digital assistants, tablet and laptop computers, content-consumption or generation devices (for music and/or video for example), personal computers, game consoles, set-top boxes including any computing device for coupling to a television, televisions connectable to a network with processing capabilities (so-called "smart TVs"), digital and analogue video recorders, DVD and other physical media playback devices (e.g. BluRay™ and universal serial bus (USB) storage devices) and other generally static entertainment devices, as well as various other domestic and non-domestic machines and electronic devices. In the case of a smart phone, the components 102, 104 and 106 are typically integrated within the device. For a personal computer, the media player 104 is typically provided by software, i.e. computer program code that is stored in memory and processed by a processor; the display device 102 may be an integrated or separate monitor. The decoder 106 may be implemented by a combination of software and hardware; for example many personal computers comprise accelerator hardware for decoding common compression formats such as H.264. For a set-top box or games console, the decoder 106 may comprise integrated dedicated hardware, the media player may comprise a proprietary software application and the display device 102 may comprise a coupled television.

In the embodiment of FIG. 1, the client device 110 is couplable to a network or series of networks such as the Internet. The client device 110 may comprise integrated or externally-coupled, e.g. via an additional USB or proprietary device, wired and/or wireless local area network (LAN) capabilities. For example, the client device 110 may be couplable to a wired and/or wireless router that is in turn connected to a DSL, cable or fiber connection to a local exchange; the local exchange may be coupled as described previously to the so-called Internet using one or more intermediate networks, such as those forming part of the PSTN. If the client device 110 comprises a mobile device such as a smart phone it may have an integrated telecommunications module for wirelessly communicating with a core network coupled to one or more TCP/IP networks; likewise, if the client device 110 comprises a laptop or tablet computer it may have an externally-coupled telecommunications modem (so-called "dongles", typically coupled via USB) for wireless communication with the core network and the wider Internet. In FIG. 1, the Internet is represented as elements 120 but in practice any communications medium or media may be used.

In FIG. 1, the media server 160 forms part of media platform 140A. In one embodiment, the media platform 140A may be coupled to the client device 110 through one or more intermediate networks 120A. In another embodiment, for example for an implementation having higher load volumes, a load balancer 130 may be coupled to the client device 110 through said intermediate networks 120A. In this latter case, the load balancer 130 directs one or more requests from the client device 110 to one of two or more media platforms; for example, in FIG. 1, either media platform 140A or media platform 140B, depending on the loading characteristics of the components of each media platform. Loading characteristics may be measured using, amongst others, one or more of: the number of user requests received in a particular time period, the usage of one or more central processor units (CPUs), and the number of concurrent active streaming sessions.

In FIG. 1, a media platform 140 may comprise a number of servers arranged to supply a number of services to a user. In FIG. 1, there are three servers: an authorization server 150, a media server 160 and a metadata server 170. These servers may comprise separate computing devices coupled to one or more networks, e.g. one or more LAN or wide area networks (WAN); separate CPU and memory systems within a common physical architecture coupled together using a common systems bus; separate software components operating on a common hardware platform, e.g. a common set of CPUs and memory; a common software component with the described functionality; or any combination of these approaches. Furthermore, even though each server may be functionally distinct, its functionality may be incorporated into a common program architecture, for example the metadata server 170 may be a functional sub-component of media server 160 or the authorization server 150 may be a functional sub-component of the metadata server 170. For ease of explanation, it will be assumed that the servers of FIG. 1 are distinct entities coupled together by a media platform network 145. Two or more of the servers making up the media platform 140 may further be implemented by separate administrative or corporate entities. For example, the media supplier may implement the media server 160 but the metadata server 170 may be implemented by a third-party and accessed using application programming interface (API) function calls; or the media supplier may operate the authorization server 150 yet source content from a media server 160 operated by a content owner or licensee.

In FIG. 1, the authorization server 150 is coupled to an authorization data source 155. The authorization server 150 is arranged to receive requests from a client device 110 for access to one or more media items. This is explained in more detail in the description of FIGS. 3A and 3B. To provide an authorization function, the authorization server 150 accesses authorization data stored in the authorization data source 155. For example, the authorization server 150 may receive a username and password from a user of client device 110. In this case, the username and password are checked against entries for the user in the authorization data source 155, i.e. the user is authenticated, and a session is established with the client device 110 if the received data matches the entries in the authorization data source 155. In this context, "session" refers to a series of communications between two or more devices, which may be encrypted or unencrypted and which may be identified using a session identifier. Within a session it is assumed that the client device 110 is being operated by the authenticated user.

In FIG. 1, the media server 160 is coupled to a number of media data sources 162. Two media data sources 162A and 162B are shown but any number of media data sources may be used in practice. In this example, media data sources 162 store audio-video data that makes up a media item. In some cases, a single video file may be stored with integral audio data; in other cases, separate audio and video files may be stored. A media item may comprise, amongst others, any one of: a film or movie, a television program, a program in a series, an Internet-distributed program, an animation, a radio program, a music video, an audio track, an item of user-generated content and home movie footage. In some cases, content for a single media item may be distributed across a plurality of separate data files, for example as may be stored in distributed database systems. For ease of explanation, in the present example, each media item will be taken as a movie stored in media data sources as a single movie data file with integrated audio data.

Media items may be received from a content provider in digital form, for example if shot onto a digital medium, or may be received in an analogue form 185. Media items received in an analogue form 185 may be converted into a digital form for storage in one of the media data sources 162 by an encoder 180. In some embodiments, each media item may additionally have a plurality of associated data files relating to different encoding standards; for example, a first encoding standard using a 3GP file format suitable for mobile devices and a second encoding standard using a H.264/MPEG-4 standard. The plurality of different files may also include files at different levels of compression and/or different resolutions for tailored delivery depending on the capabilities of the client device 110 and/or the network connection 120.

In FIG. 1, the metadata server 170 is coupled to a metadata data source 175. The metadata server 170 is arranged to receive requests from the client device 110 and/or one of the other servers for metadata relating to media items stored in the media storage devices 162. For example, for a movie the metadata may comprise, amongst others, one or more of: title, director, date of public release, genre(s), age rating, length, available subtitling, average user rating, one or more reviews, synopsis, writers, actors and actresses, country of production, language, alternative title, aspect ratio, and plot keyword(s). In some embodiments, this metadata is linked with access data such as users or user groups that are allowed access to the movie, an availability parameter that identifies a time period in which access to said users or user groups is available, and a user feedback parameter. These parameters are described in more detail below and may be stored in one of the authorization data source 155, the media data sources 162, or the metadata data source 175. In the present embodiment, each media item may have a unique identifier, for example the movie "La Haine" may have a 32-bit or 64-bit alphanumeric code—$x_i$—that is used as an index in at least the media data sources 162 and the metadata data source 175; this enables one or more data files containing content representing the movie "La Haine" to be associated with metadata describing this movie. Each of the data sources may comprise one or more local and/or remote storage media; for example solid state drives (SSDs) using flash memory or magnetic disc or tape drives.

In a variation, a content delivery network (CDN) 190 may be used to assist the delivery of a media item to client device 110. A content delivery network 190 may comprise a distributed network of computers and/or storage devices that store distributed copies of a single media item. The computers and/or storage devices are typically located to enable fast access to media items, for example the content delivery network 190 may comprise network nodes 195 at a number of different geographical locations. A user is thus directed to a copy of a media item stored at the closest node 195 to the client device 110. A content delivery network 190 may be used for faster and more reliable streaming of a media item; in such a case media server 160 may provide one or more data files to the content delivery network 190 for appropriate caching and distribution or may authorize access to content already held by the CDN 190. In certain cases, metadata supply and user authorization is still performed by the metadata server 170 and the authorization server 150. In these cases, one or more servers making up the content delivery network 190 may be authorized by authorization server to supply audio-video data to a user. In other cases, the content delivery network 190 may have internal servers that take over this functionality or such internal servers may act in association with the services provided by the media platform 140. In any case the methods and apparatus described herein may be equally applied within a media platform and content delivery network 190.

Figure 2:
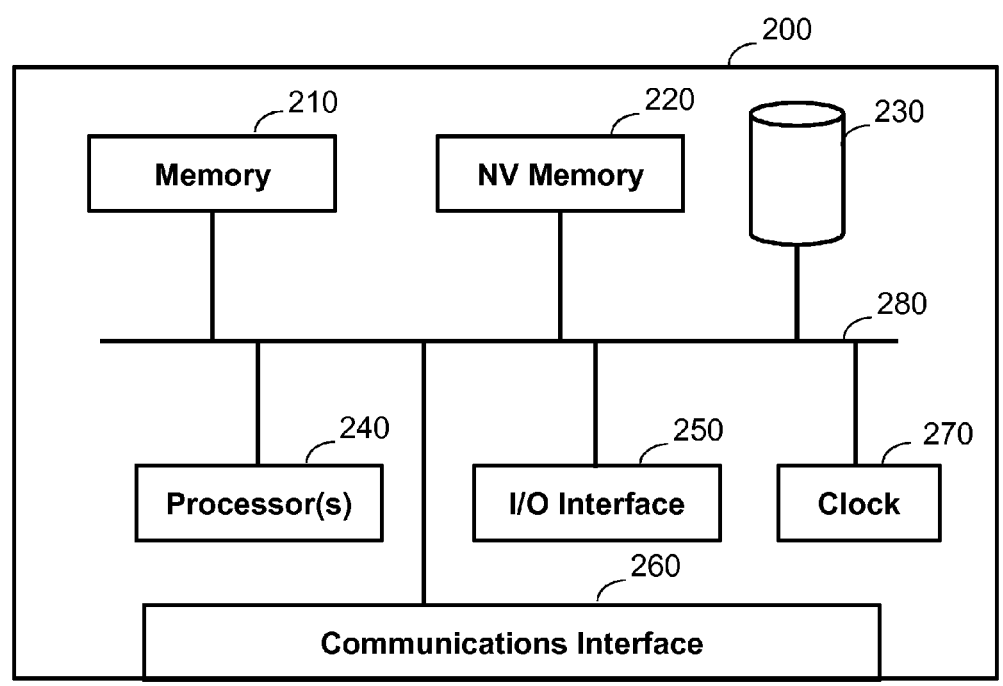
FIG. 2 is a schematic diagram showing exemplary internal components for one or more of a server and a client device.

FIG. 2 shows a hardware architecture for a computing device 200 that may be used to implement one or more of the client device 110, the authorization server 150, the media server 160, and the metadata server 170. Computing device 200 may comprise: volatile memory 210 such as Random Access Memory (RAM); non-volatile (NV) memory 220 such as a SSD or Read Only Memory (ROM); one or more storage devices 230 such as magnetic tape or disc drives; one or more processors 240; an input/output (I/O) interface 250; a communications interface 260; and a system clock 270. The components of computing device may be interconnected using a systems bus 280. The computing device 200 may comprise further components not illustrated in FIG. 2 and certain components shown in FIG. 2 may be omitted in particular implementations. For example, if the client device 110 is a mobile device the storage device 230 may be omitted, the I/O interface 250 may comprise a touchscreen and/or one or more buttons, and the communications interface 260 may comprise a wireless transceiver. If the client device 110 is a set-top box, the I/O interface 250 may comprise an Infra-Red (IR) receiver for receiving commands from a remote control and the communications interface 260 may comprise an Ethernet port. For a server, there may be multiple processors 240 and backup components.

Figure 3A:
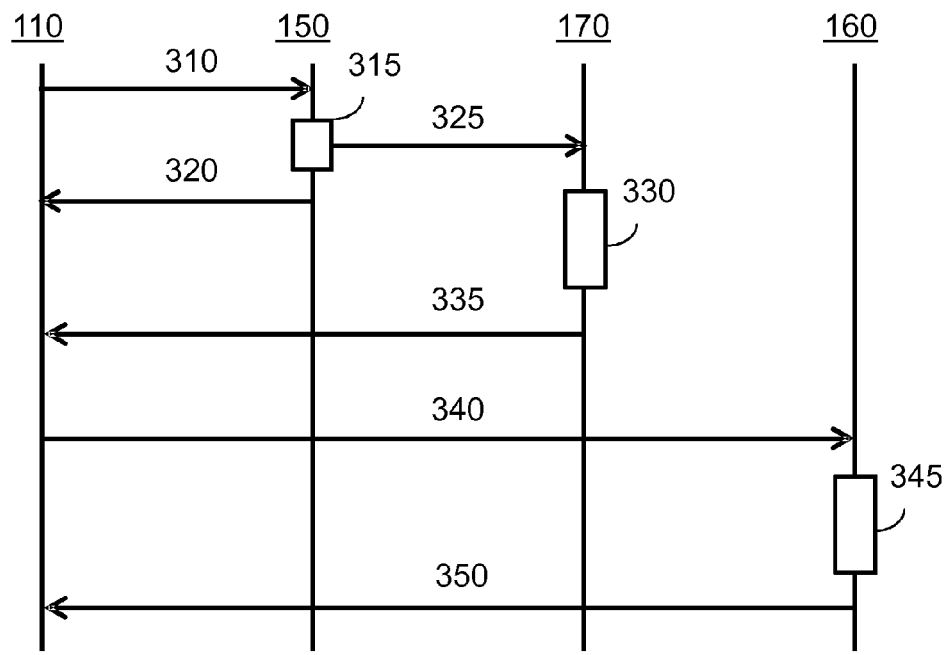
FIGS. 3A and 3B are sequence diagrams showing exemplary communications between a client device, an authorization server, a metadata server and a media server.

FIG. 3A is a sequence diagram showing a first exemplary set of communications between client device 110, authorization server 150, media server 160 and metadata server 170. At step 310, the client device 110 sends a request for access to the services of media platform 140. This request may be initiated by directing a web browser to a particular Uniform Resource Locator (URL) such that a Hypertext Transfer Protocol (HTTP) request is sent to the authorization server 150 from client device 110. In certain cases, the request may be sent transparently as part of a boot or resume procedure; for example, when a set-top box is switched on or when a 'resume from stand-by' command is sent from a remote control. If the client device 110 comprises a mobile device, the request may be sent on activation of a software application (a so-called "app") on the device by program code making up the software application.

At step 315, the authorization server 150 receives and processes the request. This may involve a dialog between the authorization server 150 and the client device 110 to exchange parameters such as a username, password, digital certificate and/or device identifier such as an identifier based on a Media Access Control (MAC) address or an International Mobile Equipment Identity (IMEI) number associated with a device. The dialog may be encrypted. One or more parameters may be stored locally on the client device 110 and/or one or more parameters may be input to the client device 110 using an I/O interface 250 following a prompt on a display. Step 315 may involve a first sub-step of authenticating a user or client device 110 based on the received parameters. In this case, parameters received from the client device 110 are checked against parameters stored within the authorization data source 155. For security, in certain cases, derivatives of the parameters rather than the parameters themselves may be used, for example a hash function of a password may be stored and compared to authenticate a user.

Once a user has been authenticated the authorization server 150 determines whether they are authorized to access media items. This may comprise evaluating user data stored in the authorization data source 150 to determine whether the user belongs to a particular user group, which may be specified in a "user group" field associated with a user identifier. A user may belong to more than one user group although for simplicity in this explanation a user will be assumed to belong to a single user group. In embodiments, a user group may comprise the set of all registered users. In certain cases, the user group may be based on a geographical location of the user. A geographical location of a user may be based on, amongst others, one or more of: a global navigation satellite system, such as the global positioning system (GPS); an IP address of the client device 110; or a registered mailing or billing address. The system described herein may be available worldwide, for example via the Internet. In a multi-jurisdictional system, such as a worldwide system, different media items may be available in different countries.

In the examples described herein, a user group has an associated group of media items that a user within the user group is authorized to access. In certain embodiments, the group of media items may be associated with an individual user instead of a user group. In the present examples, the group of media items is managed by the authorization server 150; however, in other implementations such management may be performed by media server 160, metadata server 170 or an alternate server entity.

In an embodiment, a group of media items is implemented by a data structure (D) that stores the unique identifiers x of N media items that belong to the group of media items, e.g. $D=\{x_1, x_2, \ldots x_N\}$. In an embodiment, a group of media items is dynamic, i.e. it changes in time. Hence, an availability parameter (AP) is stored for each media item. The availability parameter may be stored in data structure D, e.g. $D=\{x_1, AV_1, x_2, AV_2 \ldots x_N, AV_N\}$, or in a separate link record $L_i$, e.g. $L_1=\{x_1, AV_1\}, L_2=\{x_2, AV_2\} \ldots L_N=\{x_N, AV_N\}$. The availability parameter denotes a time in which the media item is available to a user, and, as such, a time in which the media item belongs to the group of media items. In certain embodiments, an availability parameter value sets a number (M) of time periods for which the media item is available. These time periods may comprise any discrete time period such as full hours, full days, half days, full months, full weeks, years, or a particular number of hours, days, weeks or months. For example, a time period may be set as 6 hours (e.g. enough time to watch most movie files) and the availability parameter may set access for M of these 6-hour blocks. In the examples described herein, the time periods comprise full days, i.e. 24 hour periods, starting from midnight. Other time transition points may be used in other examples, such as midday, 3 pm, 9 pm etc. Further details of methods and apparatus to implement such a group of media items are set out below.

Once a user successfully logs in, i.e. is authenticated and authorized to access a group of media items, an acknowledgement may be sent from the authorization server 150 to the client device 110, as shown in step 320. The acknowledgement may instruct a change in state of an application operating upon the client device 110; for example, a "Successful Login" message may be displayed to the user on display device 102 and the application may initiate a function to retrieve information relating to available media items. This may involve further communication with the media platform 140.

At step 325, a request to retrieve information relating to available media items is sent to the metadata server 170. Available media items comprise media items that belong to the group of media items associated with the authorized user. The request may be received from either the authorization server 150 or the client device 110. The metadata server 170 establishes a session with the client device 110 and/or the authorization server 150 based on the authorized user. This session may be encrypted, e.g. using the HTTP Secure (HTTPS) protocol. At step 330, the metadata server 170 uses the unique identifiers of the media items to supply information relating to said media items to the client device 110. In the present example, the metadata server 170 may comprise a web (e.g. HTTP) server arranged to supply Hypertext Markup Language (HTML) documents to the client device. These HTML documents are typically dynamically generated, i.e. are generated following a request from a page by computer program code such as a scripting language. Therefore, information relating to one or more media items in the group of media items is retrieved from the metadata data source 175 and compiled into an HTML document that is sent to the client device 110 at step 335. Examples of such documents are described in more detail with regard to FIGS. 5 to 9 below. In other embodiments, the metadata server 170 may comprise a data server that provides information relating to the media items in a non-HTML form to the client device 110. This may be the case if the client device 110 is running a proprietary application.

In the present example, the information returned to the client device 110 may comprise one or more links to media server 160. For example, for a particular media item a graphical control may be shown on display device 102. The graphical control may have an associated URL. In the example of FIG. 3A, this URL identifies the media server 160 and provides parameters identifying the particular media item and indicating that the user, or the client device 110, is authorized to access the media item. On activation of the graphical control a request is sent, e.g. by processing the URL, from the client device 110 to the media server 160. This is shown at step 340. The request may additionally comprise data that identifies characteristics of the client device 110 such as the type of device and its geographical location. In certain embodiments, the request may not identify the media server 170 but identify a proxy device, such as load balancer 130 or a server within content delivery network 190. This proxy may use the characteristics of the client device 110 and/or the identified media item to select an appropriate media server, which in the example of FIG. 3A is media server 170. At step 345, the request is received at the media server 170 and processed. The processing at step 345 may include locating a video file suitable for delivery to the client device 110 that contains content representing the media item; for example, that uses appropriate encoding for delivery. The processing at step 345 may also comprise processing to prepare the data file for streaming, such as buffering, establishing a stable connection, setting up a streaming session, encrypting etc. At step 350, audio-video data is returned to the client device 110. This audio-video data is received by the client device 110 and processed for display on the display device 102. The processing performed by the client device 110 typically involves decoding by the decoder 106 and buffering and/or rendering under control of the media player 104.

Figure 3B:
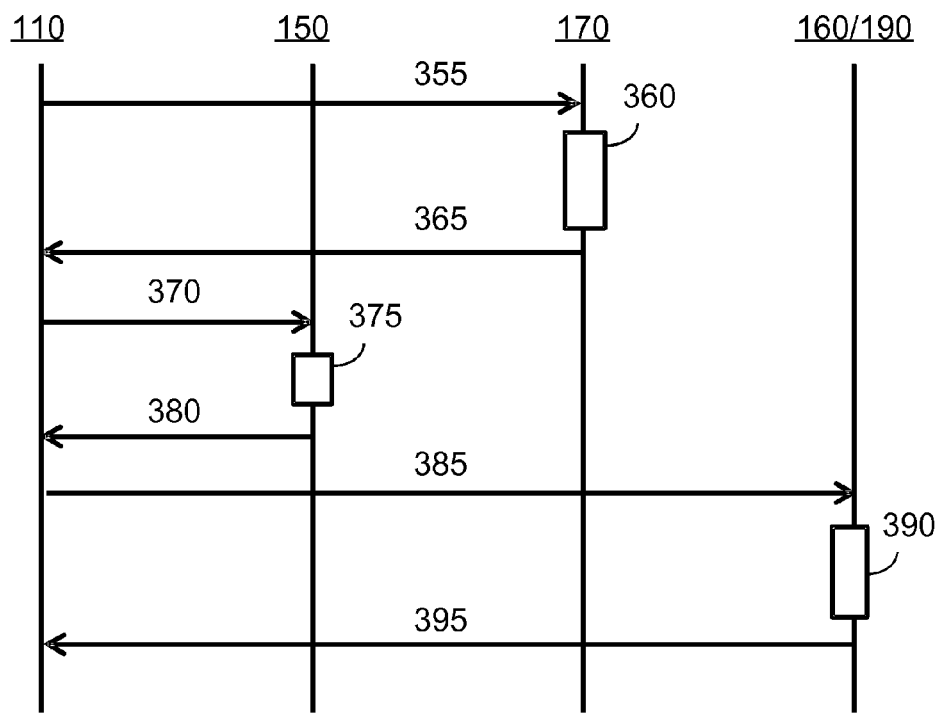

FIG. 3B is a sequence diagram showing a second exemplary set of communications between client device 110, authorization server 150, media server 160 (or CDN 190) and metadata server 170. It may be considered the best mode. At step 355 the client device 110 accesses a URL for the media supplier, e.g. sends an HTTP request. This may comprise accessing a media supplier server that may comprise, or be communicatively coupled to, metadata server 170. A collection of users, which may be all users regardless of whether they are authenticated and/or authorized, has access to metadata for media items stored in metadata data source 175. This metadata may comprise limited metadata in certain cases. Hence, at step 360 metadata for a media item is retrieved from metadata data source 175 in response to the request from the client device 110 and is returned to the client device at step 365.

In certain embodiments, there may be several different user categories. In the example of FIG. 3B the metadata server 170 may comprise functionality of the authorization server 150, e.g. may determine a user category and return appropriate metadata to a client device operated by the user accordingly, or this may be performed independently by the authorization server 150 in communication with the metadata server 170.

A first category may comprise users that are unauthenticated and that have no potential to be authorized. For example, any user that is not logged in may be unauthenticated and any user accessing the URL from a client device located in a geographically location where access to media items is not allowed may have no potential to be authorized. In this first case, the first category of users may be able to view metadata for media items but may not be able to view one or more controls that allow access to a media item itself; for example, a 'watch' or 'listen' graphical control may not be rendered as part of a displayed HTML document. In certain cases, this first category of users may also be supplied with a limited version of the metadata.

A second category may comprise users that are unauthenticated but have the potential to be authorized. For example, any user that is not logged in may be unauthenticated and any user accessing the URL from a client device located in a geographically location where access to media items is allowed may have the potential to be authorized. In this second case, the second category of users may be able to view metadata for media items and may also be able to view one or more controls associated with a media item; for example, a 'watch' or 'listen' graphical control may be rendered as part of a displayed HTML document. However, in this case, if a user activates the one or more controls, e.g. clicks on a 'watch' or 'listen' button, they are redirected to a signup or payment process. In certain embodiments this process may be supervised by the authentication server 150 and may comprise sending a signup or payment process HTML document to the client device 110 as a first step. If a user completes the signup or payment process they may then be allowed access to the media item as described below.

A third category may comprise users that are authenticated but that are not authorized. For example, a user that has signed up for a service and that is logged in may be authenticated. If the user had a previous subscription that has now expired they may not be authorized. This third category of users may have similar access to the second category of user; for example, they may be able to view metadata for media items and they may be able to view one or more controls associated with a media item, the controls redirecting the third category of users to a payment process to renew a subscription. The third category of users may also have access to additional metadata that was not present for the second category of users. For example, in this case the third category of users may have access to metadata relating to previous activity relating to the service, such as media item consumption histories, ratings, playlists, personal collections etc.

A fourth category may comprise users that are authenticated and authorized. For example, a user that has signed up for the service and that is logged in may be authenticated. If the user has a current subscription that is active they may also be authorized. This fourth category of users may have similar access to the third category of user; for example, media item and personal metadata and access to controls. If a user in the fourth category of users activates one of the controls, e.g. clicks a 'watch' or 'listen' button, they may be able to directly watch and/or listen to the media item without completing a payment process, i.e. they may have instant access.

Returning to FIG. 3B, step 370 represents a user of a client device 110 activating a control relating to a media item, for example clicking on a 'watch' or 'view' button. Using the categories described above, the user will be in either the second, third or fourth category of users. At step 375 the authorization server 150 authenticates and/or authorizes the user. For example, if a user is not logged in they may be offered a log-in form in order to be authenticated. Log-in details may be checked against details stored within authorization data source 155. Once a user is logged in, or has signed up to the service, they are authorized by the authorization server 150. This may involve checking whether the user has a current active subscription. If the user does not have a current active subscription they may be redirected to a payment process at step 380. If the user has a current active subscription, or has completed a payment process, then a digitally-signed URL is generated with an expiration timestamp with a very short Time To Live (TTL) window, e.g. 10 seconds or so, and returned to the user at step 380. The digitally-signed URL may be generated by the authorization server 150, or may be generated by the media server 160 after a user has been successfully authorized. In a first case, the digitally-signed URL directs the user of the client device 110 to a media item stored in one of the media data sources 162 at step 385. The digitally-signed URL enables access to the media item at step 390. The user can then consume the media item on the client device 110 at step 395. In a second case, the digitally-signed URL directs the user of the client device 110 to CDN 190 at step 385, in particular to a media item stored in a database at a network node 195. Media servers forming part of the CDN 190 then check the digitally-signed URL at step 390 and enable consumption of the media item at step 395. In certain cases, the media servers forming part of the CDN 190 may have no back-channel communication with one or more of the authorization server 150 and media server 160. Step 395 may involve either the download of a media file representing the media item or the receipt of a data stream that over time may comprise the content of the media item. Any of the communications may be performed over a secure channel if required. Additionally, any of the variations and features describe with reference to the processes of FIG. 3A may be adapted for use with the process of FIG. 3B.

As described above, a media item belongs to a group of media items of size N and has an availability parameter $AV_i$.

The availability parameter $AV_i$ sets a time in which a media item i is available and in the present examples the time is measured as a number—M—of discrete time periods. The availability parameter $AV_i$ may be implemented in a number of different ways while retaining the same function. In a first case, the availability parameter $AV_i$ may store the number of time periods for which the media item is available; for example, if the time periods are days, the availability parameter $AV_i$ may indicate the number of days in which access to a media item is possible—if a current clock value shows 15:00 on 11 Nov. 2013 and $AV_i=3$, the user can access the media item until 00:00 on 14 Nov. 2013. In a second case, the availability parameter $AV_i$ may store the date on which access to the media item becomes unavailable; for example, the previous example may also be implemented by setting the availability parameter $AV_i$ as 11/14/2013. In a third case, the latter example may alternatively be implemented using a compound availability parameter. In this case a first portion of the availability parameter AV1 is generated by time-stamping the date, and in some examples time, the media file was added to a group of media items (e.g. $AV1_i=00:00\ 10/15/2013$). A second portion of the availability parameter AV2 is generate by storing a value for all media items indicating M, the number of time periods that media items are available for, (e.g. AV2=30 days). A final availability parameter may then be dynamically generated, i.e. generated at a point of use, using $AV_i=AV1_i+AV2=$expiry date of the media item (e.g. 00:00 10/15/2013+30 days=00:00 11/14/2013).

In the present examples, the initial value of M, the number of time periods for which a media item is available, is set based on the number N of media items in the group of media items. For example, in the first case described above, the initial value of the availability parameter $AV_i$ may be set as: $AV_i=M=N$. In the second case, described above, the initial value of the availability parameter $AV_i=$current date/time+$M=$current date/time+N, where the current date/time is the date/time a media item is added to a group of media items. In the third case described above, the initial value of the availability parameter portions are: $AV1_i=$current date/time, where again the current date/time is the date/time a media item is added to a group of media items; and $AV2_i=M=N$. These embodiments thus provide a practical solution that may be used to implement a rotating selection of media items. The examples below describe methods of managing a group of media items with these availability parameters.

Figure 4A:
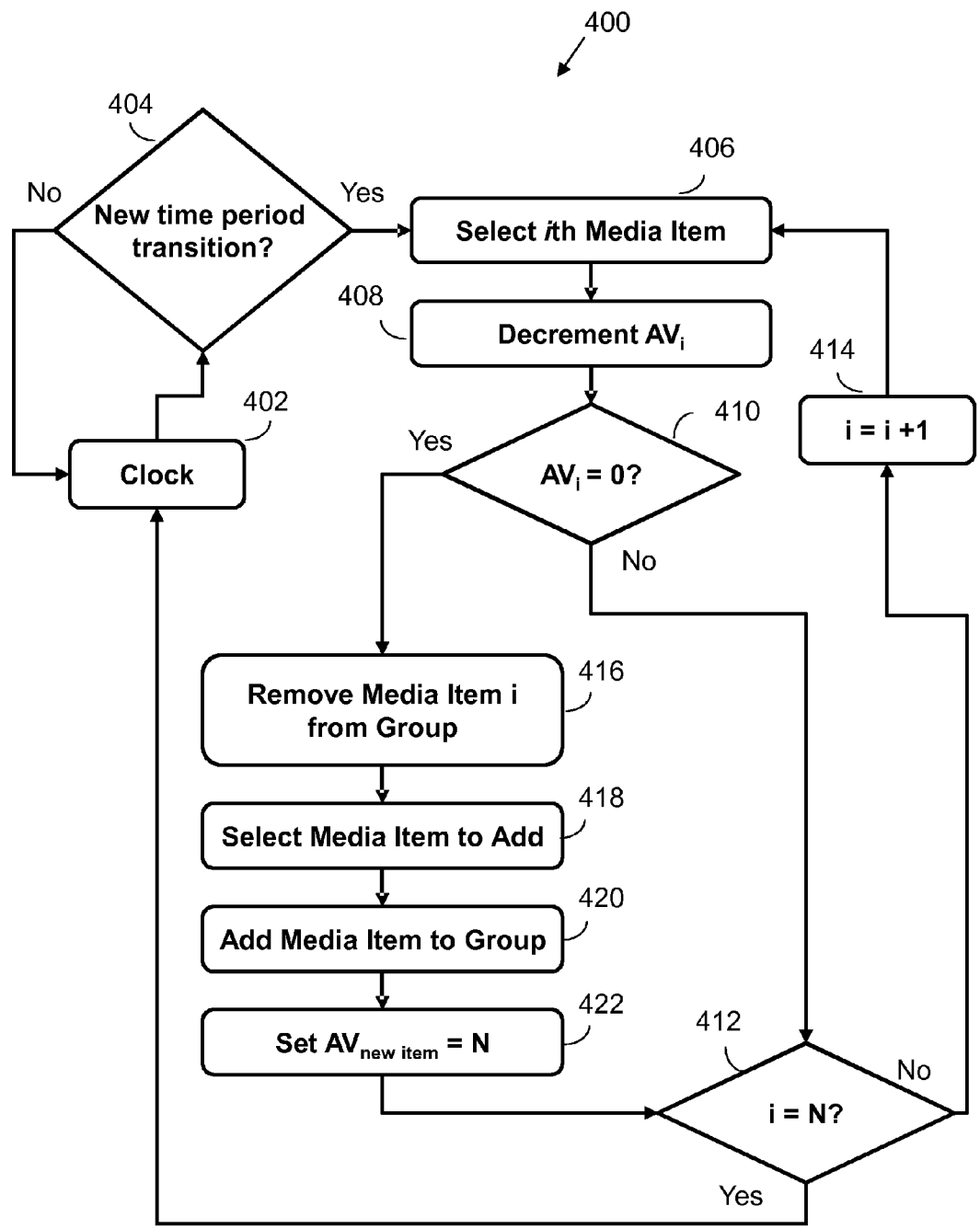
FIG. 4A is a flow diagram showing an exemplary method for controlling access to media items.

FIG. 4A is a flow diagram showing a method 400 for managing media items in a group of media items. The method 400 may be regularly scheduled so as to generate a continuously rotating selection of media items that are available for viewing by users. In FIG. 4A, a group of media items of size 30 and time periods equal to complete days are used. It is assumed that the group of media items is represented by data structure $D=\{x_1, x_3, \ldots, x_{30}\}$ and that link records are used to store the availability parameter $AV_i$, i.e. $L_i=\{x_i,AV_i\}$ for $i=1\ldots 30$. The availability parameter AV is assumed to be set according to the first case described above, i.e. to represent the number of full days within which the media item is available to a user. These assumptions are made for ease of explanation and are not to be seen as limiting.

The method 400 is initiated based on a clock value generated by clock 402. In particular, the method is initiated based on a time transition that indicates the start of a new time period as set out in step 404. For example, in Unix-based systems such as Linux, HP/UX, and OpenSolaris, the method may be implemented by a script, function, command or executable that is scheduled using time-based job scheduler 'cron'. The job scheduler is arranged to read a value of a system clock, for example system clock 270 of authorization server 150. If the time periods being measured comprise full days, a 'cron' table entry such as '0 0 * * */cntrl/daily_script.pl' may be used to initiate a Perl script 'daily_script' at midnight each day. The script may comprise an implementation of steps 406 to 422. In this case, a transition to a new time period is detected when the system clock 270 reaches midnight. If it is not midnight, i.e. a transition is not detected, the method 400 returns to monitoring the clock at step 402. If a transition is not detected, a job scheduler may return to an idle state for a set time (e.g. 1 second or 1 hour) before checking a clock value a second time.

Assuming a transition to a new time period is detected at step 404, the method 400 continues to step 406. Here a first media item in the group of media items is selected; for example i is set to 1 and $x_i$ is selected. The availability parameter $AV_i$ value is then reduced by one, i.e. is decremented, at step 408. At step 410, a check is made to determine whether the availability parameter $AV_i$ value is equal to 0, i.e. whether the time for which the media item is available has expired. If the availability parameter $AV_i$ value is not equal to 0, a check is made at step 412 to determine whether the media item is the last in the group, i.e. does i=N? If it is not the last item in the group, the value for i is incremented, i.e. i=i+1, at step 414 and the next media item is selected at step 406. If the availability parameter $AV_i$ value is equal to 0, the method 400 instead proceeds to step 416. At this step the media item is removed from the group of media items. Even though a media item is removed from the group of media items it may remain within a larger library of media items; for example, a library or archive of media items whose metadata is visible to a user yet which cannot be accessed by a user. A media item may be removed by setting to null, e.g. $x_i=[\ ]$. The method 400 then proceeds to step 418, wherein a new media item to add to the group of media items is selected. The new media item may be selected at random, from a list of prospective media items, using the method of FIG. 4C or using any other suitable method. At step 420, the new media item is added to the group of media items. This may be achieved by setting as unique identifier of the new media item, i.e. $x_i=UI_{new\ item}$. In certain embodiments, step 420 may include the step of notifying one or more users of the addition of the new media item. For example, all users, or a subset of users, may be notified by email or another messaging service such as the short message service (SMS) that a new item is available for viewing. An email notification may comprise metadata for the media item, such as a title, picture and/or a short description, as well as a link or control to enable a user to consume the media item. At step 422, the availability parameter for the newly added media item is initialized. In the present example, the availability parameter $AV_i$ value for the new media item is set as the group size, i.e. $AV_i=N=30$. This results in the newly added media item may be available for 30 days. Following step 422, the method 400 returns to step 412 to check whether all the media items have been processed. If they have not, the next media item is selected through steps 414 and 406; if they have, then steps 406 to 422, e.g. the script started by the job scheduler, ends. The method 400 returns to step 402 wherein the clock is monitored for the next time period transition.

If a group of media items is initialized such that each media item in the group has a different availability parameter value and the maximum availability parameter value equals the group size N, e.g. for $D=\{x_1, AV_1, x_2, AV_2 \ldots x_N, AV_N\}$ or $L_1=\{x_1,AV_1\}, L_2=\{x_2,AV_2\} \ldots L_N=\{x_N,AV_N\}, AV_i=i$ where $i=1\ldots 30$, then the method of FIG. 4A results in a continuously rotating selection of media files in the group of media files. If the media items comprise films or movies then, in the above example, a new film is added to the selection of available films each day, and is subsequently made available to watch for a period of time equal to 30 days. Correspondingly, each day, a film that has been available to watch for the full period of time is removed from the selection. At any one time, an authorized user has access to N different media items that they can consume without limitation as many times as they desire.

The methods and apparatus described above will now be further described with reference to a number of exemplary user interfaces that may be generated as a result of the processes within system 100 and displayed upon display device 102.

Figure 5:
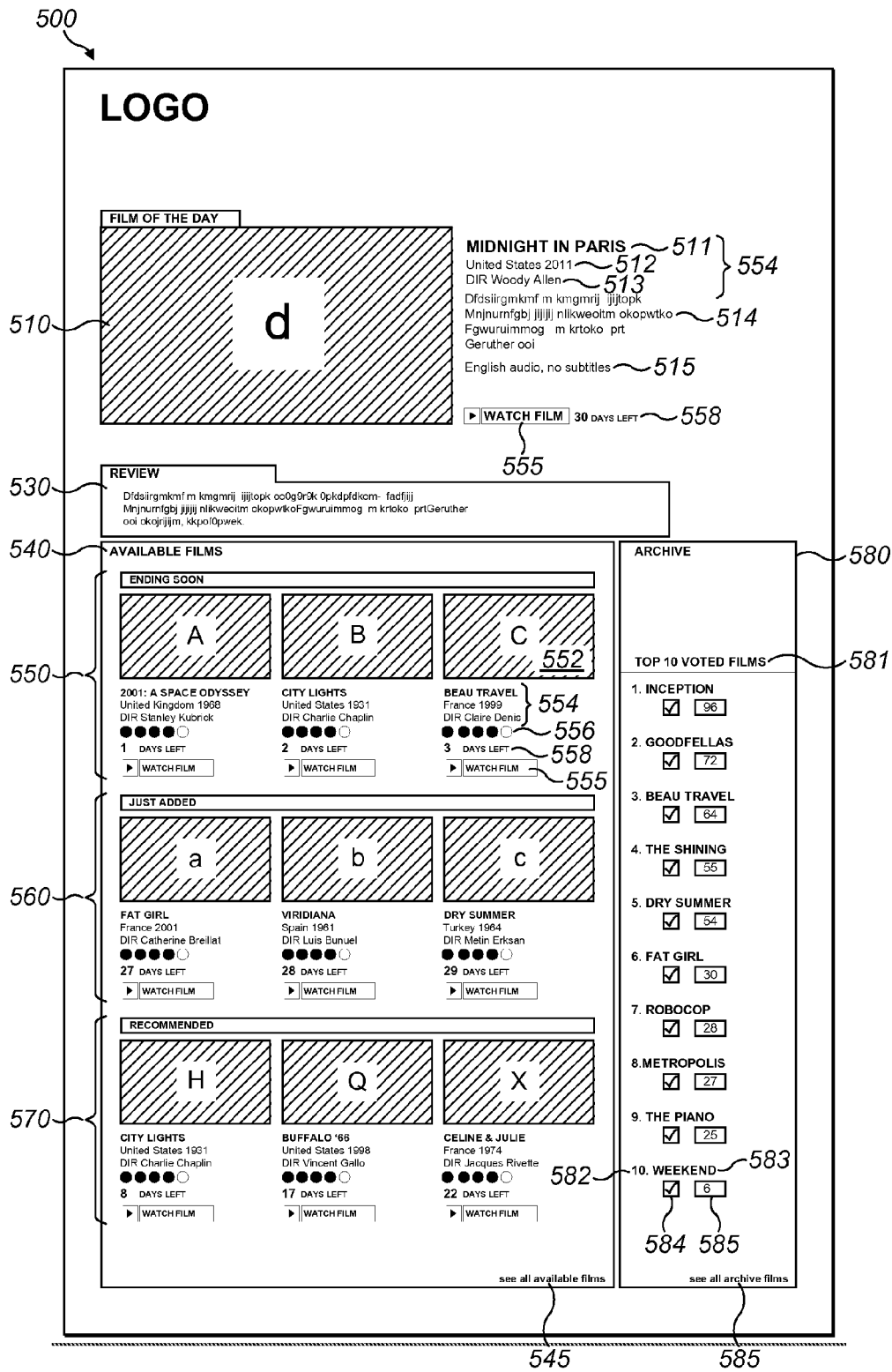
FIG. 5 is a schematic diagram showing a first exemplary user interface for use in accessing media items.

FIG. 5 is a schematic diagram showing a first exemplary user interface 500 for use in accessing media items. For example, this first user interface 500 may comprise an HTML document rendered in a window of a web browser following step 335 in FIG. 3A or step 365 in FIG. 3B, i.e. an HTML document returned by metadata server 170. In the present example, the media item that has been most recently added to the group of media items is presented as a "Film of the Day". This may be achieved automatically by retrieving the unique identifier x, of the media item in the group D with the highest availability parameter $AV_i$ value (in the example of FIG. 4A, where $AV_i$=30 days). This unique identifier $x_i$ may then be used to retrieve metadata from the metadata data source 175. In FIG. 5 this is rendered as metadata 554, which includes: a still 510, i.e. an image, from the film; a title 511; a country and date 512; and a director name 513. A brief synopsis 514 of the film is also added to the HTML portion, together with technical data 515 relating to the film such as the language of audio and whether subtitles are available. If the user is authorized, they may view the media item by clicking graphical control 555 labelled 'Watch Film'. If the user belongs to the first category of users described above graphical controls 555 may not be visible and/or rendered as part of the HTML document. The value of the availability parameter $AV_i$ is also retrieved and used to display 'Days Left' label 558, which in this case has a value of 30. In certain embodiments, the availability parameter can also be used to display the time left to view a media item in units that differ from the standard discrete time periods being used. For example, if a film is expiring on that day at midnight and it is currently 6 pm, the user interface could display "6 hours left", i.e. display the time left in units less than the discrete time unit of 'days' being used in the present example.

The first user interface 500 of FIG. 5 further presents to the user a general 'Reviews' section 530, an 'Available Films' section 540, and an 'Archive Films' section 580. The 'Reviews' section 530 provides a short extract from a recent film review. In some embodiments, the 'Reviews' section 530 displays at least a portion of a single review provided by editorial staff of the media supplier. Again this section 530 may be rendered automatically by retrieving recent review data from metadata data source 175. The 'Available Films' section 540 shows the user a selection of media items in the group of media items that they can currently access. The 'Available Films' section 540 has three sub-sections: 'Ending Soon' sub-section 550, 'Just Added' sub-section 560 and 'Recommended' sub-section 570.

The 'Ending Soon' sub-section 550 displays media items whose availability parameters indicate that the time in which the user can access the items will expire soon. In FIG. 5, metadata 554 relating to the media items with the lowest three availability parameter values is displayed to the user. Again, this metadata 554 may be retrieved automatically from the metadata data source 175, and any required additional data sources, together with a film still 552, the value of the availability parameter $AV_i$ in the form of a 'Days Left' label 558 and an average user rating 556. The latter feature is displayed as a rating out of 5 and may be based on the average of each user's rating of the particular media item. In certain embodiments, the average user rating 556 may comprise an interactive control that enables a user to submit a rating for a displayed media item. As a variation, anywhere a feedback parameter is viewable by a user, a user is also able to submit feedback values for the feedback parameter. In FIG. 5 the three media items have 'Days Left' labels 558 respectively reading: '1 Day Left', '2 Days Left' and '3 Days Left'. If the first case of availability parameter is used this represents respective values of 1, 2 and 3. A graphical control 555 is also displayed for each film to allow the user to click and view the media item.

The 'Just Added' sub-section 560 is similar to the 'Ending Soon' sub-section 550 but displays the most recently added media items, excluding the 'Film of the Day' media item. Hence, in FIG. 5 the three media items have 'Days Left' labels 558 respectively reading: '27 Day Left', '28 Days Left' and '29 Days Left'.

The 'Recommended' sub-section 570 shows a number of media items selected from the group of media items that have a high match with a user's personal preferences. The match may be determined by any known recommendation engine that takes as input data relating to a user, such as age, nationality, viewing history, media item rating history and outputs probabilistic matching scores for media items in the group of media items. The recommendation engine may also make use of metadata relating to the media items, which may be retrieved from metadata data source 175, as well as so-called 'social' characteristics, i.e. data relating to other users.

Figure 6:
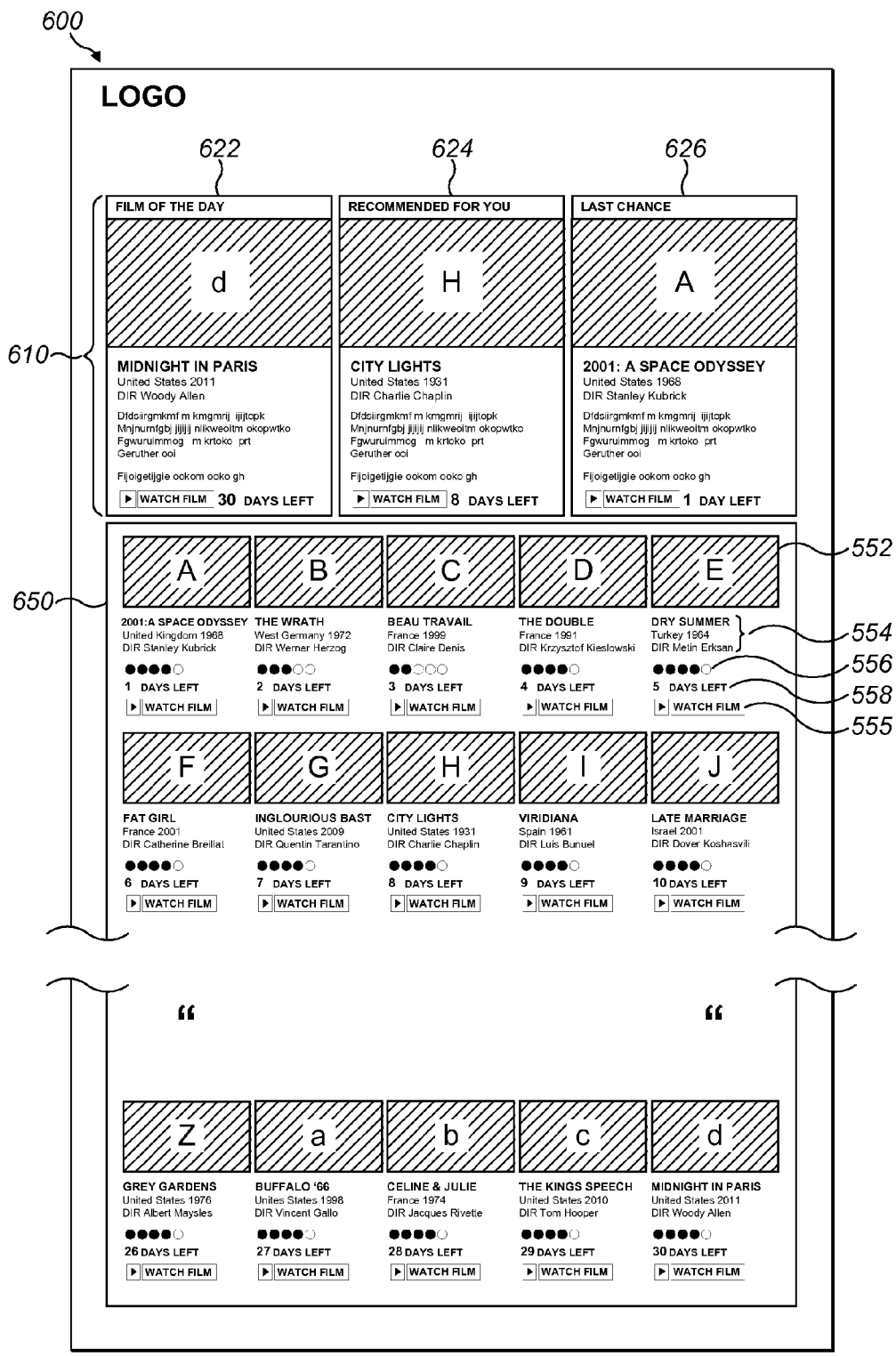
FIG. 6 is a simplified schematic diagram showing a second exemplary user interface for use in accessing media items.

The first user interface 500 of FIG. 5 may be displayed to the user as a landing page. This may be following authentication and/or authorization according to FIG. 3A, or the landing page may be shown to all users as described with reference to FIG. 3B. The first user interface 500 also may comprise a hyperlink 545 that links to an HTML document that displays all media items within the group of media items that are available to the user. FIG. 6 shows an exemplary second user interface 600 that may be provided by the display of such an HTML document in a suitable browser. This second user interface 600 may comprise a header section 610 that shows metadata for the 'Film of the Day' 622, for a recommended film 624 and for the film that is next to expire 626. The metadata takes the same form as that described with relation to FIG. 5. The second user interface 600 also comprise a body section 650 that displays metadata for each media item in the group of media items. For example, as can be seen in FIG. 6, metadata is displayed for 30 media items and each media item has a 'Days Left' value of between 1 and 30.

In the present examples, the media items in the group of media items may be selected from a library of media items (a so-called 'archive'). In certain cases, metadata for media items that are in the library of media items but are not in the group of media items is displayed to a user. This is shown in a third user interface 700 illustrated in FIG. 7. As can be seen from a comparison of FIG. 6 and FIG. 7, the metadata displayed for each media item is similar: there is a film still 712, metadata 714 and an average user rating 716. However, the user is not presented with any option to view the films displayed in FIG. 7; for example, there is no graphical control 555. The user thus cannot access any of the media items whose metadata is shown in the third user interface 700. The user can only browse through further pages of metadata using navigation links 750. In certain embodiments, the library of media items may comprise any collection of media items. In other embodiments, the library of media items consists of media items that were previously accessible but that are now inaccessible. In this latter case, once media items are removed from a group of accessible media items they are added to the library of media items, i.e. added to an archive. Hence, in the latter case, media items in the library of media items have previously belonged to the group of accessible media items.

Figure 8:
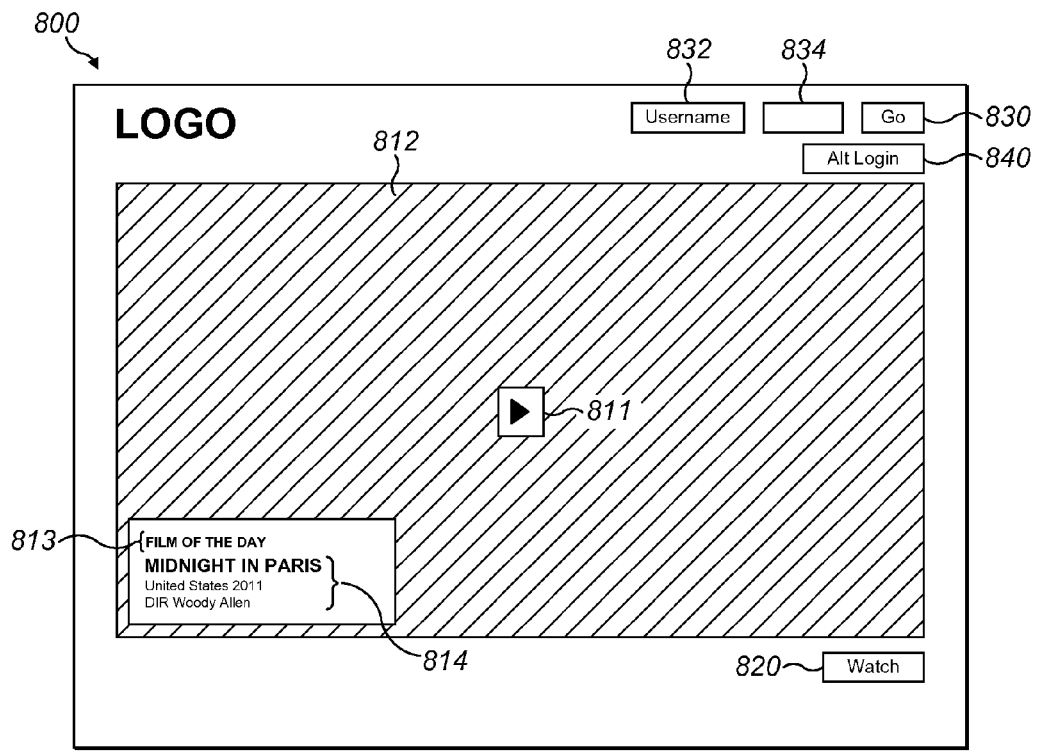
FIG. 8 is a simplified schematic diagram showing a fourth exemplary user interface for viewing metadata.

FIG. 8 shows a fourth user interface 800 that may comprise an alternate landing page to the first user interface 500. A similar user interface, minus certain graphical controls, may also be used by a user to view an available media item. A user interface for viewing media items, similar to the fourth user interface 800 may be displayed following activation one of the graphical controls 555 associated with a particular media item, e.g. following a single or double click of a graphical control using an input device.

The fourth user interface 800 shows a viewing panel 812 for audio-video metadata relating to a particular media item. In the present example, the media item may comprise the 'Film of the Day' and the audio-video metadata may comprise a trailer, teaser, video review or clip for the 'Film of the Day'. In a first state, the viewing panel 812 may contain a still image from the audio-video metadata and a further graphical control in the form of a 'play' button 811 displayed on top of the still image. On activation of the 'play' button 811 the audio-video metadata may commence playing in viewing panel 812. A similar procedure may be followed for the full content of the media item in a viewing user interface. A further separate graphical control in the form of a 'Watch' button 820 may also be provided that links to the full content of the media item, e.g. said viewing user interface, if a user is authenticated and authorized. A further option to view the audio-video metadata (or media item) in a 'full screen' mode may also be provided, i.e. such that the viewing panel 812 is expanded to fill all available screen space on a display device. When showing the still image from the audio-video metadata, the fourth user interface 800 may additionally show information relating to the availability of the media item, for example in FIG. 8 that the media item is the 'Film of the Day', and further metadata 814 for the media item, such as film title, country, year and director.

The fourth user interface 800 also shows authentication controls 830 to 840 that may be used to authenticate a user as part of an authorization procedure, for example steps 370, 375 and 380 of FIG. 3B. In the case described with reference to FIG. 3B, all users are able to view the audio-visual metadata. However, in certain cases, a guest or unauthorized user may be directed to a payment process on activations of graphical control 820. In other cases, in relation to a viewing interface, an unauthenticated and/or unauthorized user may able to view information similar to that shown in the fourth user interface 800, e.g. an image and metadata for the 'Film of the Day', but associated graphical controls, similar to controls 811 or 820, may not be operational until the user has been authenticated using the authentication controls 830 and 840 and deemed an authorized user and/or subscribed. A viewing user interface may have a black or dark background to facilitate viewing and a link to a media items profile. Additional text may be displayed in a dark font to avoid disturbing a viewing of a media item. Again, a full screen viewing option may be available.

In FIG. 8, a first set of authentication controls comprise a username input box 832, a password input box 834 and a request submission control 830. A user may thus use the first set of authentication controls to send a username and password to the authorization server 150 on activation of the request submission control 830. A second set of authentication controls may comprise alternate login control 840. This may comprise a hyperlink to a third-party authentication and/or authorization service that is configured to authenticate and/or authorize a user. The third-party authentication and/or authorization service may use the Open Authorization (OAuth) standards.

Figure 9:
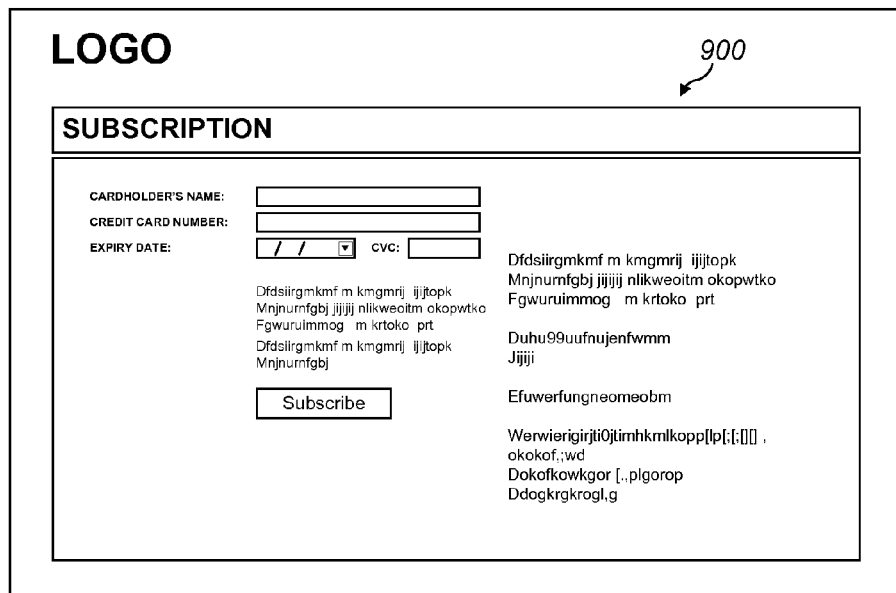
FIG. 9 is a simplified schematic diagram showing a fifth exemplary user interface for registering a user.

In certain embodiments, if a user has not registered with the authorization server 150 or a third-party service they are required to register their details and/or set up appropriate payment options for a subscription. FIG. 9 shows an exemplary fifth user interface 900 that may be used to set up a payment option for a subscription. For example, a user may be directed to the fifth user interface 900 if they are authenticated but not authorized users. Users may have the option to, amongst others: pay for subscription access at a regular interval (e.g. monthly or annually); obtain a discount for annual payment; and obtain free subscription periods for inviting friends, i.e. non-subscribers, to the service.

As illustrated in FIG. 9, the fifth user interface 900 may be configured for display on different display devices; for example, the fifth user interface 900 is suitable for display on a display device such as a television located a number of meters away from a user. This may further be true for the first to fourth user interfaces. Similarly, any of the first to fourth user interfaces may have associated display information that configures the user interface for the form of client device 110. For example, data may be prepared for display on a mobile device or via a mobile application (a so-called 'app'). This may be based on information identifying the client device 110 received from the client device 110 of the authorization data source 155.

Another embodiment will now be described. For ease of explanation, this embodiment will be described in the context of the previously described methods and apparatus; however, it may also be used in isolation from the previously described methods and apparatus.

Figure 7:
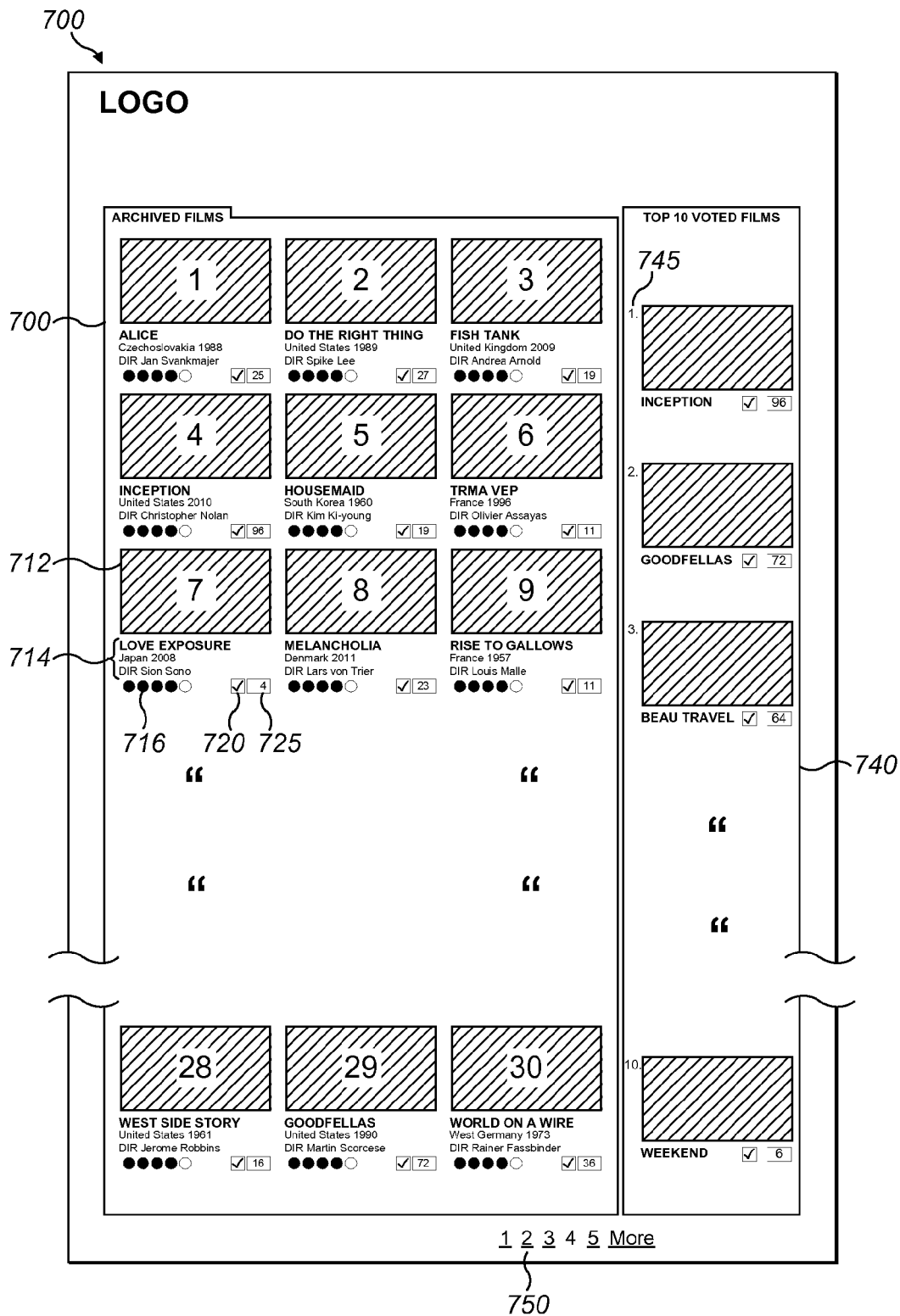
FIG. 7 is a simplified schematic diagram showing a third exemplary user interface for use in viewing a library of media items.

As described in relation to FIG. 7, each media item in the group of media items may be selected from a larger library of media items, wherein in most cases the number of media items in the library of media items is much greater than the number of media items in the group of media items. This library of media items is referred to as the 'Archive' or set of 'Archived Films' in the exemplary user interfaces FIGS. 5 to 9. The 'Archive' may comprise media items that were previously accessible but that have now been removed from the group of media items. When a user has restricted access to the group of media items, the user is not able to access, e.g. watch or listen to, media items in the library of media items that do not form part of the group of media items. For example, in the third exemplary user interface 700 shown in FIG. 7, there is no 'Watch' graphical control associated with a media item and as such a user cannot access said media items.

When a media item is selected to be added to the group of media items, for example as part of step 418 in FIG. 4A, it is, in these examples, selected from the library of media items. In certain implementations of the previous embodiments, the media item to be added may be selected from a database of media items that does not comprise the archive, said database being in some cases inaccessible to a user and comprising media items that have not previously been accessible. In comparison, the present embodiment provides a method for selecting a particular media item from an archive of media items to add to the group of media items; although it may also be applied to other forms of media libraries. This method need not be used for all media items that are added to the group of media items, for example it may be used as a special case such as at the end of a particular time period, as part of a holiday festival or when a particular threshold relating to user behavior is passed. The method is based on feedback received from one or more users.

The third user interface 700 of FIG. 7 shows an additional set of graphical controls to receive and display user feedback relating to a library of media items. A media item in the library of media items, when displayed such as in the third user interface 700, has a feedback entry control 720 and a feedback display control 725. The feedback entry control 720 enables a user to provide feedback regarding a particular media item in the library of media items. The feedback display control 725 displays an indication of the feedback received from a group of users, for example all users or all users in the same geographical location. In the simple case of FIG. 7, the feedback entry control 720 may comprise a graphical hyperlink. When activated, e.g. by a user click or touch, an HTML request is sent to a URL. This URL may comprise a service call or a server, in the present example metadata server 170. In other implementations, the request may be made to the authorization server 150 or media server 160. Assuming the authorization server 150 is used, a routine such as that shown in FIG. 4B is initiated.

Figure 4B:
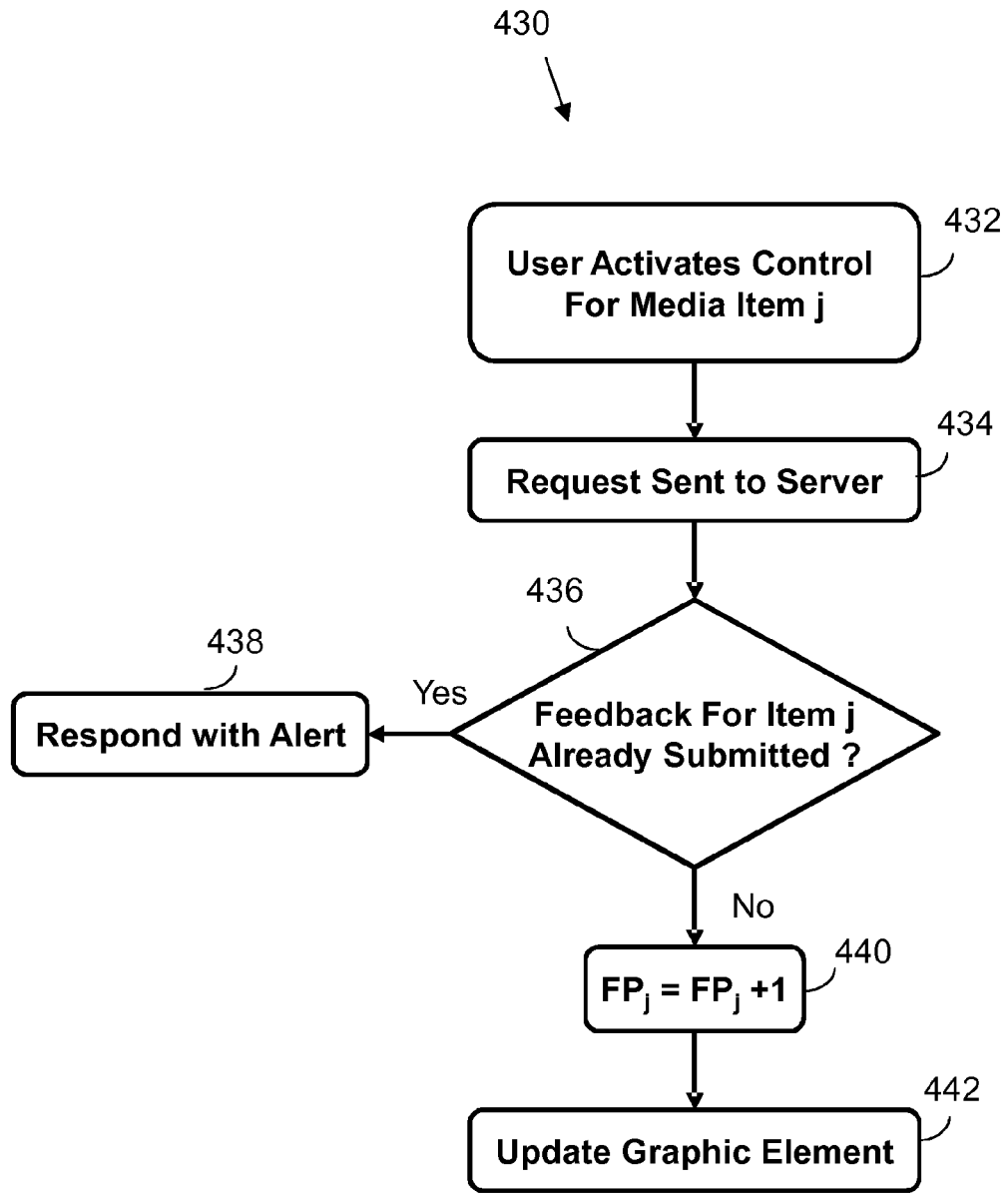
FIG. 4B is a flow diagram showing an exemplary method for providing user feedback.

FIG. 4B is a flow diagram showing an exemplary method 430 for providing user feedback in relation to a media item in the library of media items. At step 432, a user activates a control for a particular media item j, for example by activating a feedback entry control 720 for a displayed media item j in the list of 'Archived Films'. At step 434, activation of the feedback entry control 720 sends a request to metadata server 170, the request identifying media item j and the user that is presently authorized, e.g. that is logged in to the system 100. At step 436, the details for the currently authorized user are checked to determine whether the user has already submitted feedback for media item j. This information may be stored, amongst others, in the form of a list of media item identifiers relating to a user account record in authorization data source 155 or in the form of a list of user identifiers relating to a media item record in metadata data source 175. If the current user has already provided feedback for the media item j, for example the identifier for media item j is within the list associated with the current user's account or the identifier of the current user is within the list associated with the media item record, an alert may be returned to the user as shown in step 438. The alert may indicate that the user has already provided feedback for media item j. Alternatively, instead of an alert, the server receiving the request may simply ignore the request at step 438. If the current user has not yet provided feedback for the media item j, for example the identifier for media item j is not within the list associated with the current user's account or the identifier of the current user is not within the list associated with the media item, a feedback parameter (FP) associated with media item j is updated at step 440.

In a first case, the feedback parameter may comprise a count parameter that counts the number of activations (or 'votes') from different users. In this first case, at step 440 the feedback parameter is incremented, i.e. one is added to the existing feedback parameter value. In a second case, the feedback parameter may comprise an average rating, e.g. a value out of 5 or 10, for a group of users, e.g. all users or a set of users in a particular geographical location. In this case the feedback parameter may be updated by calculating a revised average value to take account of a current user rating submitted at step 434. In a third case, the feedback parameter could comprise a parameter denoting whether one or more users have added a media item to a list or personal collection of preferred or 'favorite' media items. The list or collection may be associated with the user and visible to other users, unauthenticated users and/or unauthorized users. For example, in a basic case, when a user adds a particular film to a list of favorite films for the user, a count representing the feedback parameter for that particular film is incremented. In some embodiments, a media item is added to a list for a user using a graphical control displayed with media item metadata. Other embodiments for the feedback parameter are also possible. Moreover, the feedback parameter may comprise a compound parameter that uses a weighted or non-weighted combination of two or more types of feedback parameter.

Once the feedback parameter has been updated at step 440, the feedback display control 725 is updated to reflect the new value of said parameter. This may be performed actively, such as by sending a response from the responsible server to the client device 110 instructing a refresh of the data, or passively, such as the next time the client device 110 refreshes a user interface. Returning to FIG. 7, in this example, each feedback display control 725 shows a number value representing the total number of user feedback requests received from distinct users for a particular media item.

Figure 4C:
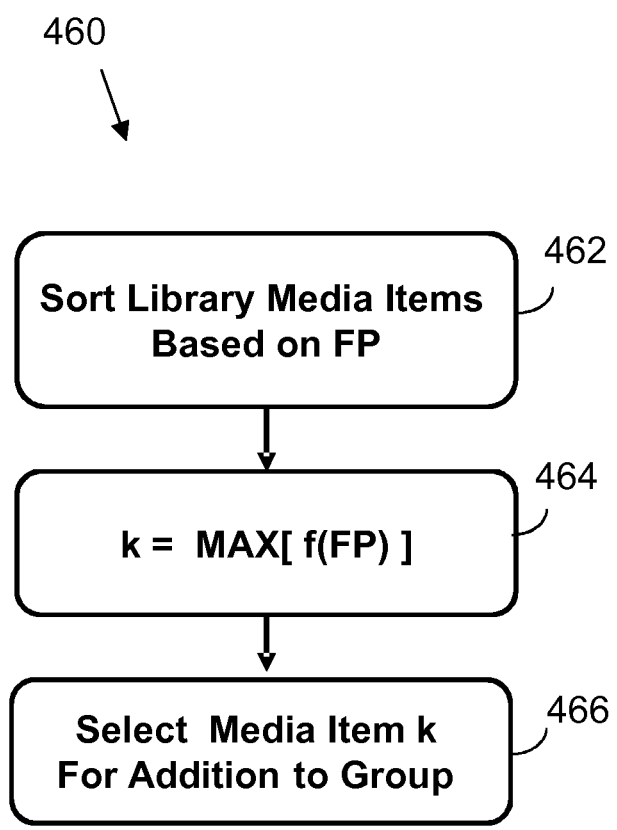
FIG. 4C is a flow diagram showing an exemplary method for selecting a media item to add to a group of media items.

FIG. 4C is a flow diagram showing an exemplary method 460 for selecting a media item to add to the group of media items using the aforementioned feedback parameter. For example, the method 460 may implement step 418 in FIG. 4A in certain circumstances. At step 462, the media items in the library of media items that are not already part of the group of media items are sorted based on a feedback parameter value. In the present example, the feedback parameter is a count parameter and thus the media items are ranked in descending order based on the feedback parameter value. A sort is generally performed to speed up retrieval of a media item, and in some embodiments may be omitted or incorporated into step 464. In one implementation, a link record is used to store a unique identifier for a media item x, and its associated feedback parameter FP, i.e. $LFP_j=\{x_1, FP_j\}$, wherein $j=1 \ldots R$, where R equals the number of media items in the library of media items and the set excludes media items in the group of media items, e.g. $LFP_1=\{x_1, FP_1\}$, $LFP_2=\{x_2, FP_2\}$ ... $LR=\{x_R, FP_R\}$. In other implementations, the feedback parameter may form part of the data within any one of the data sources 155, 165 or 175. At step 464, a function, f(FP), is performed on the feedback parameters and the maximum result k of the function is returned. In a first case, the function may simply return the feedback parameter values; as such step 464 selects the media item with the highest feedback parameter. In other cases, other statistical measures based on the feedback parameter may be used; for example, the function may invert the feedback parameter values, such that the media item with the minimum feedback parameter is selected. This case could select "unknown" films. Where a group of one or more media items have the same feedback parameter value, one media item may be selected at from said group based on a heuristic, such as based on a random selection or based on the media item with the most recent feedback submission. In certain embodiments, more than one media item may be selected, for example the media items with the top three feedback parameters may be selected. At step 466, the media item k returned by step 464 is selected as the media item to add to the accessible group of media items. For example, the media item k may be added to the group at step 420 in FIG. 4A.

Returning to FIG. 7, the exemplary third user interface 700 shows a side panel 740 that displays metadata for media items that have been ordered based on their feedback parameter values. In FIG. 7, the side panel 740 displays the 'Top 10 Voted Films', i.e. the ten media items in the library of media items that have the highest feedback parameter values. The media items are displayed in rank order, as shown by ranking 745. In the example of FIG. 7, film number 1 would be selected as the media item to add to the group of accessible media items were the method of FIG. 4C to be applied. The information displayed in side panel 740 may be dynamically updated, e.g. may be based on the current (or recently cached) values of the feedback parameters, such that if the media items ranked 2 and 3 had feedback parameters that differed by 1 and two more users expressed their feedback for the third ranked media item, said media item would swap places with the second ranked media item. The side panel 740 may comprise a feedback entry control 720 and a feedback display control 725 for each ranked media item in a similar manner to those shown for the 'Archived Films'. The side panel shown in Figure is also displayed in the first user interface 500 shown in FIG. 5. Here side panel 580 also shows the 'Top 10 Voted Films', wherein each ranked media item has a rank 582, a title 583, a feedback entry control 584 and a feedback display control 585. The latter controls function in the same manner as controls 720 and 725.

In a variation of the above-described embodiment, the media item selected based on the feedback parameter does not form part of the group of media items, as described for example with reference to FIG. 4A, referred to hereafter as a first group of media items, but instead forms part of a second group of one or more media items that is accessible by a user. The first and second groups of media items may be accessible to a user at the same time but the accessibility parameters need not be related; for example, the second group of media items may be accessible without access to the first group of media items. In this case, the media item or items selected based on the feedback parameter may be available for a specified period of time, for example a time-limited period such as a particular day or weekend. This may occur at regularly or irregularly scheduled intervals, for example at the end of every month.

In another variation, the media items in the library of media items may comprise media items that were previously accessible to a user and whose availability has now expired. For example, once a media item is removed from the first group of media items at step 416 of FIG. 4A, it may for part of the library of media items. In this manner, when a user provides feedback data for a media item in the library of media items it can be thought of as 'voting' to 'bring back' a media item into the first group or into accessibility.

In another variation, the feedback parameter and/or feedback control may be supplied and managed by a third party, e.g. a party other than the media supplier. For example, one or more social networking sites may offer APIs or HTML code to share or publish a reference to the media item to one or more network users. In this case, the values for the feedback parameters may be retrieved via an API call on data stored by the third party. More than one set of feedback parameters may also be used, for example a cumulative feedback parameter may be used for the selection of a media item that sums individual feedback parameter values from a variety of third parties. For example, the feedback entry control may provide an option to publish a reference to the media item on a social networking site, a short messaging service or via email. The user may choose one or more of these options. In certain cases, if the user chooses more than one of these options the cumulative feedback parameter is only incremented by one for that particular user. In summary, certain embodiments and variations describe a video-on-demand subscription service that offers subscribers a continuously rotating selection of media items, e.g. films, which are available for viewing. In a particular implementation, each day, a new media item is added to a selection of available media items, referred to herein as a first group of media items. The new media item is thus subsequently made available to watch for a period of time. Correspondingly, each day, in the same implementation, a media that has been available to watch for the period of time is removed from the group of media items. In additional embodiments, subscribers can view a listing of all media items that have previously expired, and vote to 'bring back' certain media items and make them available again. In certain embodiments and variations, at any given time, a subscriber has access to watch a first group of available media items. The selection includes a certain number of media items, equal to the number of days that a single media item is made available. For example, if a single media is made available to watch for a 30 day period, the first group of available media items contains 30 items at one time. While a media item is part of the first group of available media items, a subscriber can watch the media item as many times as desired, at any date or time. These embodiments have the added benefit that the content licensing costs of the media provider are greatly reduced, as content only need to be licensed a limited period of time, i.e. the period of time that each media item is available.

In certain embodiments and variations, each day, at a specified time (e.g. midnight), a new media item is added to the first group of available media items. On the day that the media item is added, it is highlighted to users and may be supplemented with editorial content pertaining to the media item. After its addition to the first group, the media item is then available to watch for a specified period. Each subsequent day, the number of days remaining in this period may be communicated to the subscriber (i.e. the user).

In certain embodiments and variations, each day, at the same time that a new media item is added to the first group, a media item in the first group that has been shown for the full specified period of time (e.g. 30 days) expires, and is removed from said group.

In certain embodiments and variations, a number of user interfaces may be provided. A first user interface may display information about the highlighted media item added that day, as well as a digest of several media items from the first group, including recently added media items, media items about to expire, and media items recommended to the user based on their tastes, i.e. based on data relating to user that represents said tastes. The user can also access a second user interface that displays the entire selection of available media items, displayed in order of time left until expiration, i.e. in order of availability parameter values.

In certain embodiments and variations, all users can access a third user interface showing an archive or library or media items. This third user interface may display information about all media items that have been previously available. Additionally, in some embodiments, users can vote to "bring back" any individual media item, wherein the media items with the most user votes are displayed in a ranking on one or more of the user interfaces. On a regular basis the top voted media item, or certain top voted media items, may be made available to subscribers again for a specified period of time (e.g. one day).

The above embodiments are to be understood as illustrative examples of the invention. Further embodiments of the invention are envisaged. For example, media items may comprise text data, audio data, video data, interactive data or a combination of these forms, for example, games or other interactive content. Authentication and/or authorization may be based on a client device rather than a user; for example, based on a unique client device identifier and thus authentication and/or authorization may occur transparently to a user. Even though the examples above have been primarily presented in the context of a video or film streaming service, the methods and apparatus can equally be applied to the downloading of media items as well as or instead of streaming. For example, 'access' to a media item, instead of relating to allowed streaming of content, may relate to permission to download and/or play a media item downloaded to a client device. Even though the user interfaces described herein have been primarily described as HTML interfaces that are rendered on a browser, any graphical, textual or audio user interface may be used, including application interfaces and non-HTML interfaces. The controls described herein further need not be graphical; for example, they may be activated orally, i.e. using voice control, based on audio cues or they may be purely textual. Even though separate server entities such as authorization server 150, media server 160 and metadata server 170 have been described, their functionality may be provided by one or more server devices with a differing arrangement. For example, in certain cases the authorization server 150 and the metadata server 170 may comprise a common server with one or more computer-implemented procedures. In certain cases the function of media server 160 may be subsumed into one or more of the authorization server 150 and the metadata server 170; for example, this may be the case where a media item is provided by a CDN 190 instead of the media server 160. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

What is claimed is:

1. A computer-implemented method of controlling access to a media item over an electronic communications medium, comprising:
    providing, to an electronic device, access to a group of media items having a fixed group size N, where N is the number of media items in the group, a media item having an availability parameter, the availability parameter indicating a number of time periods M within which access to the media item is available, each media item in the group having a different availability parameter value; and, for a transition to a new time period:
    removing a first media item from the group of media items whose availability parameter indicates that the time within which access to the media item is available has expired for the new time period; and
    adding a second media item to the group of media items, the availability parameter for the second media item being set such that the number of time periods M is equal to the fixed group size N, and
    wherein N and M are greater than 1.

2. The method of claim 1, wherein an availability parameter comprises a countdown value indicating the number of time periods for which a media item is available and the method comprises, for a transition to a new time period, decrementing each availability parameter in the group of media items.

3. The method of claim 1, wherein an availability parameter identifies a particular time period in which access to an associated media item will expire and the method comprises, for a transition to a new time period, determining whether any of the availability parameters for the group of media items identify the new time period.

4. The method of claim 1, further comprising:
    receiving a request from a user to access a media item;
    determining whether the media item is within the group of media items; and
    if the media item is within the group of media items, allowing the user access to the media item.

5. The method of claim 1, further comprising:
    authorizing a user;
    determining whether the user has access to a group of media items;
    if the user has access to a group of media items, displaying, on a user interface, metadata for one or more media items in the group of media items to the user including one or more controls for accessing said one or more media items.

6. The method of claim 5, wherein the step of determining whether the user has access to a group of media items further comprises:
    determining a location for a user;
    allowing access to a group of media items associated with the location.

7. The method of claim 5, wherein the step of displaying metadata for one or more media items comprises displaying metadata ordered based on the availability parameters for the media items within the group of media items.

8. The method of claim 5, wherein the step of displaying metadata for one or more media items further comprises displaying one or more of:
    metadata relating to the second media item;
    metadata relating to a media item in the group of media items whose availability parameter indicates the time within which access to the media item is available will expire in a subsequent time period; and
    metadata relating to a media item in the group of media items that is recommended to the user based on the output of a recommendation engine.

9. The method of claim 1, wherein the second media item is selected from a library of media items that are not accessible by a user, wherein metadata for the library of media items is accessible by a user.

10. The method of claim 9, wherein the metadata comprises a user feedback parameter for a media item, a user being able to submit a request to modify the user feedback parameter, media items in the library of media items being selected as candidate media items for addition to the group of media items based on the user feedback parameters.

11. The method of claim 10, further comprising displaying metadata for one or more media items in the library of media items ranked based on the user feedback parameter.

12. The method of claim 1, wherein the media item comprises audio-video data.

13. The method of claim 1, wherein accessing a media item comprises streaming a media item.

14. A method of controlling access to media items, comprising:
    receiving a request from a user of a client device; and
    at a server device, granting access to a set of N media items, each media item being available for a number M of time periods, the values of M for the set of media items ranging from 1 to N,
    wherein, for each new time period, if the availability of a media item has expired, said media item is removed from the set of N media items and replaced by a new media item with a value of M equal to N, and wherein N and M are greater than 1.

15. The method of claim 14, wherein the set of N media items are selected from a library of R media items, wherein R is greater than N, the new media item being selected from said library.

16. Apparatus for controlling access to a group of media items comprising:

a control database comprising records identifying at least a group of media items of fixed group size N, where N is the number of media items in the group, the records storing an availability parameter for a media item, the availability parameter indicating a number of time periods M within which access to the media item is available, wherein each media item in the group has a different availability parameter value; and a media access component coupled to the control database, the media access component arranged to grant access to the group of media items to a client device and, for a transition to a new time period:

remove a reference to a first media item from said records identifying the group of media items, the first media item being a media item whose availability parameter indicates that the time within which access to the media item is available has expired for the new time period; and add a reference to a second media item to said records identifying the group of media items, the availability parameter for the second media item being set such that the number of time periods M is equal to the fixed group size N, and wherein N and M are greater than 1.

17. The apparatus of claim 16, wherein the media item comprises a video file for streaming to the client device over a network, the client device comprising a display device for viewing audio-video data associated with the streamed video file.

18. The apparatus of claim 16, wherein, responsive to a transition to a new time period, the authorization server is arranged to remove a media item from the group whose availability parameter indicates that the time within which access to the media item is available has expired for the new time period.

19. The apparatus of claim 16, comprising:

a metadata server coupled to a metadata data source, the metadata server arranged to provide metadata relating to one or more media items to the client device, said one or more media items comprising one or more media items in the group of media items and/or one or more media items that do not belong to the group of media items.

20. The apparatus of claim 16, wherein the first media item and the second media item are accessed via a media server coupled to at least one media data source, the at least one media data source storing the first media item and the second media item for supply, by the media server, to the client device over a network.

* * * * *